(12) United States Patent
Harashima

(10) Patent No.: US 6,343,401 B1
(45) Date of Patent: Feb. 5, 2002

(54) WIPER BLADE WITH WIND DEFLECTOR

(75) Inventor: Mitsuo Harashima, Saitama (JP)

(73) Assignee: Nippon Wiper Blade Co., Ltd., Saitama (JP)

( * ) Notice: Subject to any disclaimer, the term of this patent is extended or adjusted under 35 U.S.C. 154(b) by 0 days.

(21) Appl. No.: 09/509,207

(22) PCT Filed: Sep. 24, 1998

(86) PCT No.: PCT/JP98/04278

§ 371 Date: Mar. 24, 2000

§ 102(e) Date: Mar. 24, 2000

(87) PCT Pub. No.: WO99/15384

PCT Pub. Date: Apr. 1, 1999

(30) Foreign Application Priority Data

Sep. 25, 1997 (JP) .............................................. 9-260203

(51) Int. Cl.[7] .................................................. B60S 1/38
(52) U.S. Cl. .................................................. 15/250.201
(58) Field of Search ....................... 15/250.201, 250.44, 15/250.361, 250.451, 250.452, 250.48

(56) References Cited

U.S. PATENT DOCUMENTS 5,218,735 A * 6/1993 Maubray ................ 15/250.201

FOREIGN PATENT DOCUMENTS

| DE | 3532536 | * | 3/1987 | |
|---|---|---|---|---|
| DE | 4017078 | * | 11/1991 | |
| EP | 433169 | * | 6/1991 | ............ 15/250.201 |
| FR | 2621288 | * | 4/1989 | |
| GB | 2106775 | * | 4/1983 | ............ 15/250.201 |
| GB | 2146891 | * | 5/1985 | ............ 15/250.201 |

* cited by examiner

*Primary Examiner*—Gary K. Graham
(74) *Attorney, Agent, or Firm*—Wenderoth, Lind & Ponack, L.L.P.

(57) ABSTRACT

A wiper blade 10 for use in motor vehicles includes a wind deflector 22 which is provided in an air stream and supported in position on a main yoke through a support of reduced width. The wiper blade includes the wind deflector which has been formed to have such a configuration in its cross-section so as to include a plate-like pressure-receiving surface section 28 which is provided along the air stream so as to generate downward forces, an air stream-weir section 30 which is provided to extend from the rear end of the pressure-receiving surface section so as to reduce a velocity of the air stream, and an air stream-splitting section 26 which extends downwardly from the end of the pressure-receiving surface section so as to form a water-weir section below the pressure-receiving surface section.

13 Claims, 8 Drawing Sheets

RELATIONSHIP BETWEEN WIND VELOCITY
AND LIFTING FORCES

TEST ON REAL VEHICLE REGARDING LIMIT
VEHICLE SPEAD FOR WIPING OPERATION

RELATIONSHIP BETWEEN H
AND LIFTING FORCES

WIPER BLADE WITH WIND DEFLECTOR

TECHNICAL FIELD

The present invention relates to a wiper blade for use in motor vehicles. In particular, it relates to means for effectively suppressing a possible reduction of wiper blade performance characteristics which may otherwise occur due to wind pressure etc., while a vehicle runs at a high-speed, and to a means for substantially improving aerodynamic characteristics of a wiper blade.

BACKGROUND ART

Many means have been used for the purpose of suppressing a possible reduction in the wiping performance of the wiper blade for motor vehicles, which may otherwise occur due to wind pressure at a high-speed. Various means may be listed for illustrative purposes including a device with plate-like blades. One blade may be adapted to provide a downward partial wind pressure force by forming a part of lever in a blade-like configuration, and one blade may comprise a wind deflector for shielding an air stream which strikes the blade rubber. In addition, an article may be provided in which a distance between the undersurface of the wind deflector and the glass surface is determined to be greater at the front of the air stream than at the rearward portion so as to generate a negative pressure between the undersurface of the wind deflector and the glass surface.

Such devices as those illustrated in FIG. 14 (DE.3139444), FIG. 15 (DE.3532536) and FIG. 16 (FR.262128) and the like can be cited as typical known arts, all of which may operate satisfactorily to some degree when vehicles run at a speed of around 150 km/h which is a conventional speed requirement for high-speed driving. However, it may be difficult for prior art devices to provide a satisfactory operation when the vehicles run at a speed of around 200 km/h which is a today's common running velocity.

The device in FIG. 14 is designed to deflect an air stream which strikes the blade rubber 1 by means of wind deflector 2 which is provided at a position where it may shield the blade rubber 1. However, it might not shield the blade rubber 1 due to a reduced area of the wind deflector 2. In addition, an air stream which has passed through a space between levers may cause a disturbance, resulting in a lack of effective urging forces, to thereby create problems in that a substantial improvement during high-speed running might not be achieved.

The device shown in FIG. 15 is configured such that a lower edge 3 of the main yoke side wall extends in a spoiler design providing a particular inclined angle. However, it also causes a problem in that sufficient urging forces may not be produced since the air stream over the upper surface of the spoiler collides against the side wall of the main yoke, and thus the flow velocity is reduced, while simultaneously the air stream flowing over the undersurface of the spoiler is interfered with by a lever etc., to prevent a smooth flow of the air stream.

The device in FIG. 16 is designed to have a configuration in which a distance between the undersurface of the wind deflector 4 and the glass surface 5 is made greater at the front of the air stream than at the back side, thereby creating a negative pressure between the undersurface of the wind deflector 4 and the glass surface 5. This approach entails, however, a problem that it may not be effective unless the wind deflector 4 is provided at a lower position, and if the wind deflector is made to be wider to provide an effective result, the wind deflector 4 may interfere with the curved glass surface or the wind frame.

SUMMARY OF THE INVENTION

In the conventional devices as above-described, provision was made for means for improving wiper blade performance while a vehicle runs at high-speed. In particular, the devices were designed by taking aerodynamic characteristics into consideration which may occur either at the front side (upper surface in the drawing) or at a back side (lower surface in the drawing) of a wind deflector or a spoiler, based on a presumption that the air stream strikes the glass surface in a parallel manner. In contrast, the present invention is made with a presumption that an air stream is deflected upwardly as it interferes with the wiper blade, taking an air stream into consideration which acts against opposite surfaces of the wind deflector from the viewpoint of aerodynamic behavior. As a result, a most effective aerodynamic design has been realized.

In summary, in the wiper blade for use in motor vehicles a wind deflector is placed such that its side surface lying in front of the air stream may consist of an air stream-splitting section which may form a water-weir area at the rear-side of the air stream, a pressure-receiving surface section along the air stream which may create downward forces, and an air stream-weir section which may cause the air stream to flow at a reduced speed, as shown in FIG. 3. A height H between the lower edge of the air stream-splitting section in front of the air stream and the wind shield is greater than the height h of the blade rubber. In addition, there is a relationship between the height H and a clearance S to be formed between the upper end of the above-described air stream-weir section of the wind deflector and the main yoke, and this relationship is given as $1 > (S/H) \leq 1/5$ or preferably $1 > (S/H) \geq (1/4)$. In addition, there may be a relationship between the length L1 of the pressure-receiving surface section and the length L2 of the air-stream weir section in the cross-section of the wind deflector, and this relationship is given as $L1 \geq L2$. Further, an angle $\theta 1$ to be made between the pressure-receiving surface section and the glass surface is in a range of $0 < \theta 1 \leq 30°$, and a relative angle $\theta 2$ to be made between a plane of the air-stream weir section and a plane the pressure-receiving surface section is in a range of $30° \leq \theta 2 \leq 90°$.

The air stream which flows along a wind screen is split into upper and lower flow components by means of an air stream-splitting section at the tip of the wind deflector. An upper air stream component flows along the pressure-receiving surface section, and rises upwardly while having its flow velocity reduced by means of the weir section. The lower flow component partially forms a virtual blade surface at a lower portion of the pressure-receiving surface section utilizing a water-weir area which is created backwards from the air stream-splitting section. Most of the lower flow component is caused to vary its flow direction upwardly while it flows along the virtual blade surface and the backward surface of the weir section to increase its flow velocity. The flow then passes through a space between the upper end of the weir section in the wind deflector and the side wall of the main yoke . Consequently, an in creased pressure is exerted on the upper surface e of the pressure-receiving surface section of the wind deflector, and a reduced surface pressure is provided to thereby generate downward forces (i.e. forces acting toward the wind screen).

BRIEF DESCRIPTION OF THE DRAWINGS

Embodiments of the present invention will be described below with reference to accompanying drawings, in which.

DETAILED DESCRIPTION OF THE INVENTION

Figure 1:
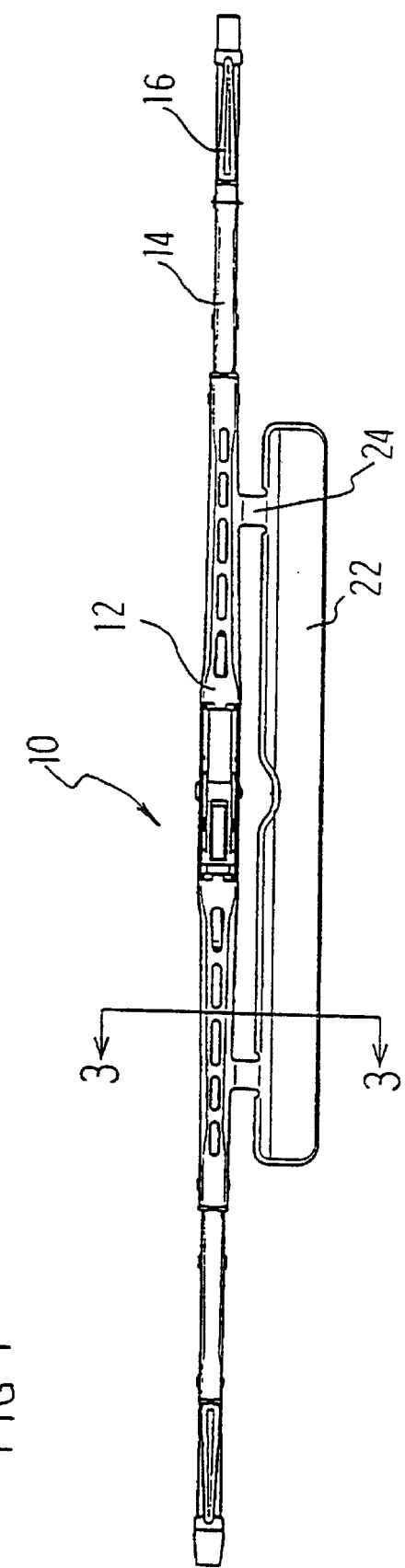
FIG. 1 is a top plan view of the wiper blade with the wind deflector of the present invention.
Figure 2:
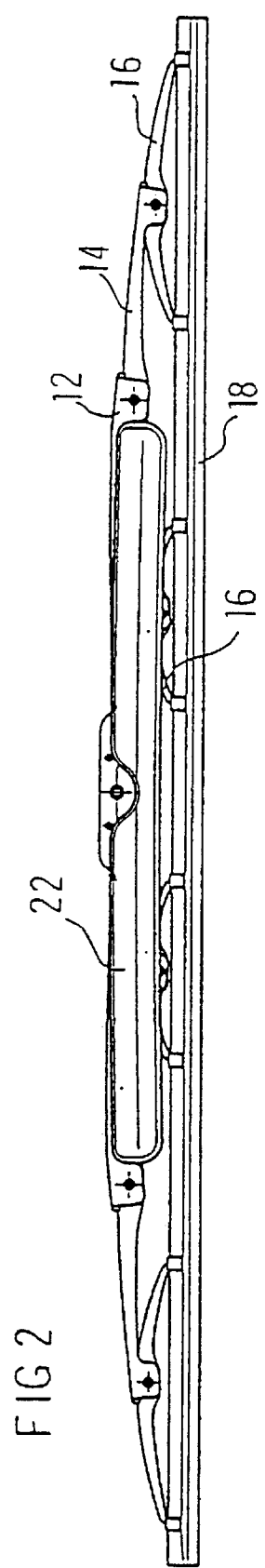
FIG. 2 is side plan view of the wiper blade with the wind deflector of the present invention.

FIGS. 1 and 2 are upper plan and side views of the wiper blade with a wind deflector, illustrating a typical embodiment of the present invention. In these drawings, the wiper blade 10 with the wind deflector in accordance with the present invention comprises a main yoke 12 which includes a coupling with the wiper an at its central portion, a secondary lever 14 which is pivotably supported at opposite ends of the main yoke, a plurality of yokes 16, each being pivotably supported on one or opposite ends of the secondary lever 14. A pawl is provided for grasping a blade rubber 18 which is used to wipe a glass surface 20 (see FIG. 3) such as a windshield etc. In addition, the wiper blade comprises a wind deflector 22 which is provided in front of the air stream of the main yoke 12.

This wind deflector 22 may be made by a stamping operation, for example, so as to be integral with the above-described main yoke 12, and may then be connected with the main yoke 12 by means of narrow support 24. Obviously, it is also possible to form this wind deflector 22 by a molding operation, for example, using resins or iron sheets separately from the main yoke 12, and subsequently the wind deflector 22 may be coupled with the main yoke 12 by a predetermined means.

Figure 3:
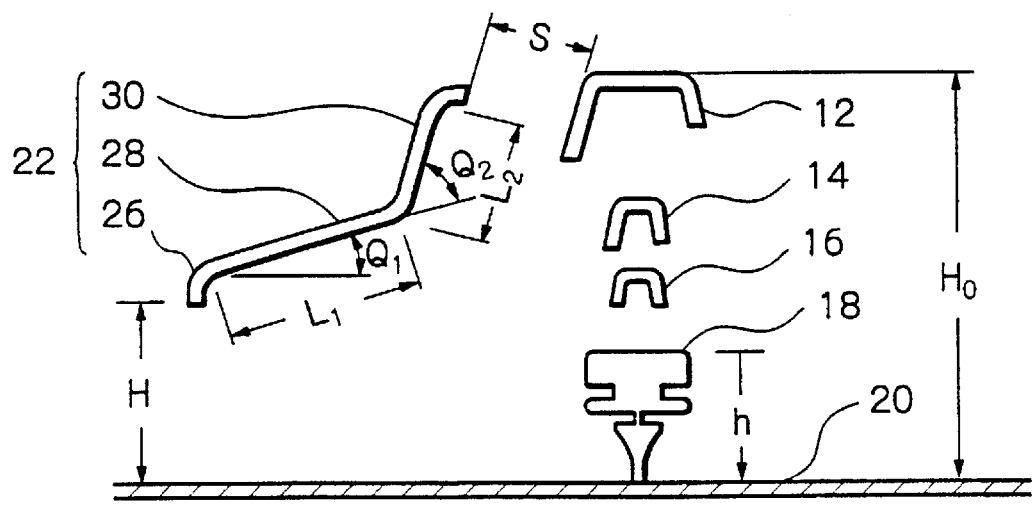
FIG. 3 is a schematic cross-sectional view along line 3—3 in FIG. 1.

The wind deflector 22 in accordance with the present invention is made, as shown in FIG. 3 which is taken along line 3—3 in FIG. 1, so that its cross-sectional shape consists of an air stream-splitting section for allowing the air stream to be split into two flow components, including a pressure-receiving surface section 28 which is provided above the air stream-splitting section 26, and an air stream-weir section 30 which is provided further above the pressure-receiving surface section 28. Since it is required for the wind deflector 22 to receive an air stream flowing at an extremely high-speed, the wind deflector must be secured reliably to the main yoke 12 using as many supports 24 as possible to avoid possible breakage. At the same time, it is required to allow a great amount of air to flow through a clearance between the wind deflector 22 and the main yoke 12, and thus supports 24 must be made in such a shape and number as not to interfere with the flow of the air stream. In the embodiment as shown in the drawings, two supports 24 each of which has a substantially circular configuration are molded so as to be integral with the wind deflector 22 and the main yoke 12.

As can be seen from FIG. 3, the upper edges of the wind deflector 22 are located at a predetermined distance S from the side surface position of the main yoke 12. When a distance from the glass surface 20 is compared, the distance H to the lower edge of the air stream-splitting section 26 of the wind deflector 22 is greater than the height h of the blade rubber 18. In order to form a water-weir section of negative pressure at the lower surface side of the pressure-receiving surface section 28 of the wind deflector 22 so as to bring the wind deflector 22 closer to the glass surface 20 side, there may be a relationship between the above-described distance S and the distance H of the wind deflector 22, and the relationship is described as $1 > (S/H) \geq (1/5)$, and preferably $1 > (S/H) \geq (1/4)$. In the meantime, a symbol Ho in FIG.3 is understood to represent a height dimension to be measured from the glass surface 20 to the upper edge portion of the main yoke 12.

The described air stream-splitting section 26 consists of a portion which extends to form substantially a right-angle relative to the glass surface 20, having a length of several millimeters. When the wiper blade 10 incorporating the window deflector of the present invention operates to wipe the glass surface 20, the air stream-splitting section may operate to split the air stream which flows along the glass surface into upper and lower flow components around the wind deflector 22. The air stream-splitting section 26 may alternatively be formed such that it may be coupled in such a cross-sectional configuration that an angle of curvature is formed from the lower edge of the pressure-receiving surface section 28. Furthermore, this air stream-splitting section 26 may be made to extend toward the wiper blade side as shown in FIG. 8~FIG. 13 so as to increase rigidity of the wind deflector 22, provided that its tip end forms a negative pressure water-weir area under the pressure-receiving surface section 28. The pressure-receiving surface section 28 may form an angle $\theta 1$ relative to a surface which is parallel to the glass surface 20 from the upper end of the air stream-splitting section 26, and extends to a length L1. This angle $\theta 1$ should preferably be 0° through 30°. The air stream-weir section 30 may form an angle $\theta 2$ relative to the extension line of pressure-receiving surface section 28 from the upper end of pressure-receiving surface section 28, and extends to a length L2. This angle $\theta 2$ should preferably be 30° through 90°. It is also preferable for there to be a relationship between L1 and L2 as $L1 \geq L2$. In the cross-sectional shape of the window deflector 22, the pressure-receiving pressure section 28 and the air stream weir section 30 are connected with each other through a small radius curvature to prevent blockage of the air stream which flows at high-speed.

In the present invention, the wind deflector 22 should preferably have a length at least one third or more that of the wiper blade. Otherwise, effective urging of the wind deflector against the wiper blade itself may not be realized. In this instance, although the central portion of the wind deflector along its length should preferably coincide with the center of the length of the wiper blade, a desired effect may be provided even when the central portion of the length of the wind deflector is located in a slightly offset manner from the center of the length of wiper blade toward the tip portion side. The reason for this is that a more substantial air stream disturbance occurs in the tip portion side.

In the above arrangement, the air stream which flows along the glass surface i.e., windshield 20, is split into upper and lower flow components by means of air stream-splitting section 26 of the wind deflector 22. The upper flow component flows along the pressure-receiving surface section 28. The flow then has its flow velocity decrease by the weir section 30, and rises upwardly over the weir section 30 while urging the pressure-receiving surface sections 28 downwardly (toward the glass surface side) and then flows backwardly. On the other hand, the lower flow component of the air stream acts to form a virtual blade surface below the pressure-receiving surface section 28 due to the presence of a wide water-weir zone which is created at the back of the air stream-splitting section 26. Most of the lower flow component has its flow velocity increased while it flows along the virtual blade surface and the back surface of the weir section 30 altering its flow direction. The lower flow component makes this weir-zone a negative pressure zone, and then exits passing through a clearance S between the upper end of the weir section 30 in the wind deflector and the side wall of the main yoke 12 at a rapid speed. Thus, an increased pressure may be exerted upon the upper surface of the pressure-receiving surface section 28 of the wind deflector 22, whereas the lower surface is exposed to a reduced pressure. In this way, the wind deflector 22, hence the wiper blade 10, is provided with forces which may act in a downward direction (toward the glass surface).

Figure 4:
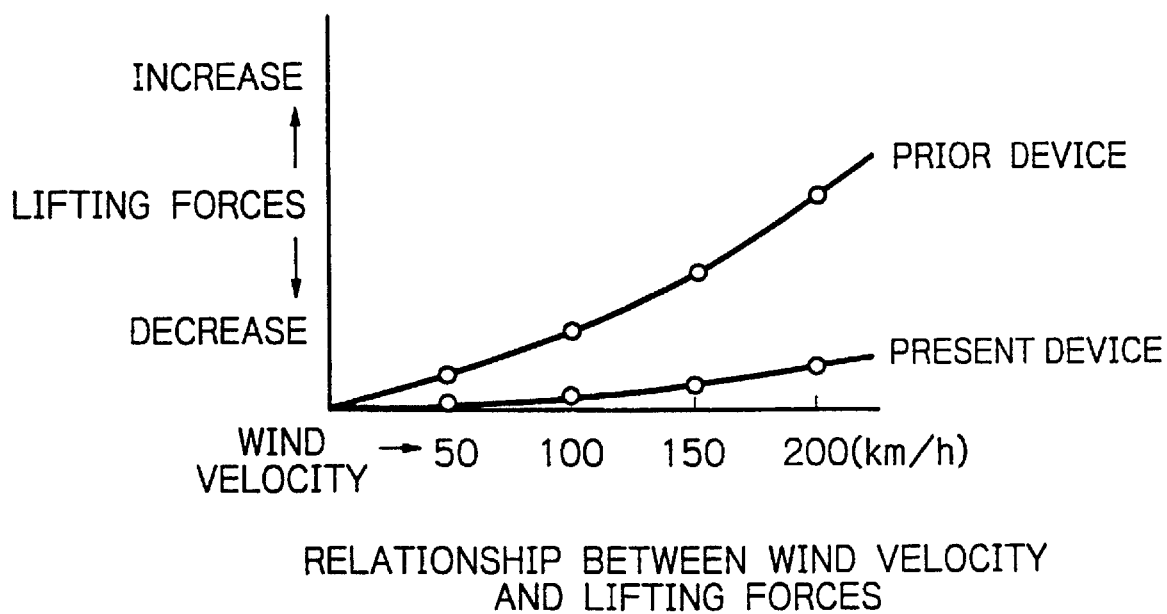
FIG. 4 is a view illustrating a comparison between the products of the present invention and a prior art product in their wind velocity and lifting forces.
Figure 14:
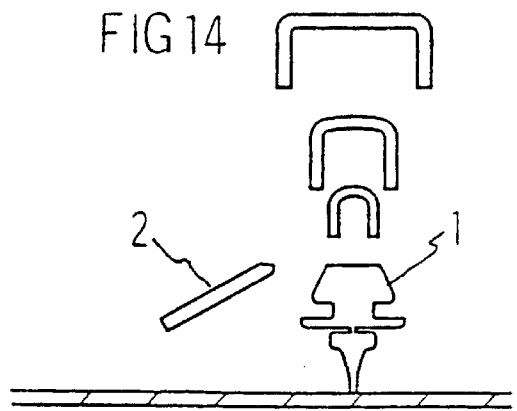
FIG. 14 is a view illustrating a known example.
Figure 15:
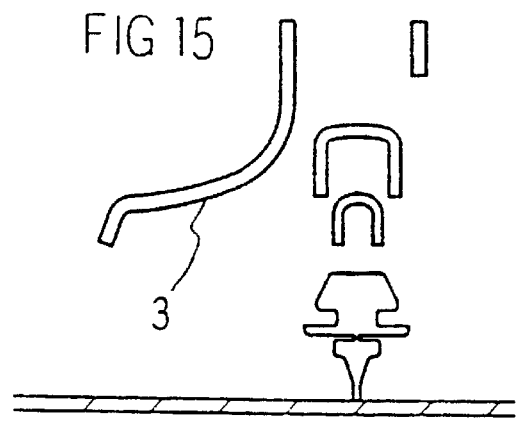
FIG. 15 is a view illustrating another known example.
Figure 16:
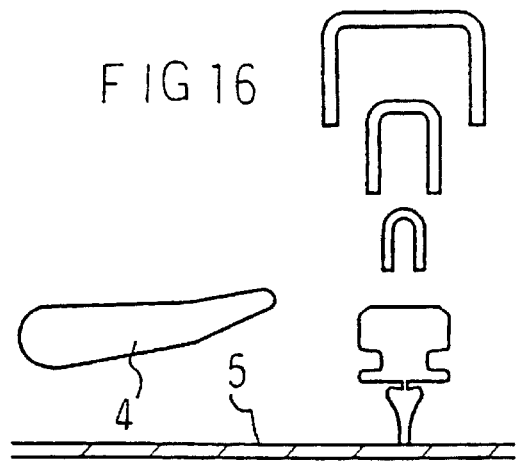
FIG. 16 is a view illustrating a further known example.

FIG. 4 shows measurement results which have been obtained by using a small wind tunnel device for the embodiments of the present invention and for the prior art devices as shown in FIGS. 14–16. As can be seen from this drawing, effective lifting forces in the device of the present invention amount to merely 25% of the lifting forces which may be encountered in the prior art device at all vehicle running speeds, which demonstrates a significant improvement which may be achieved by the present invention with respect to urging forces to be exerted against the glass surface.

Figure 5:
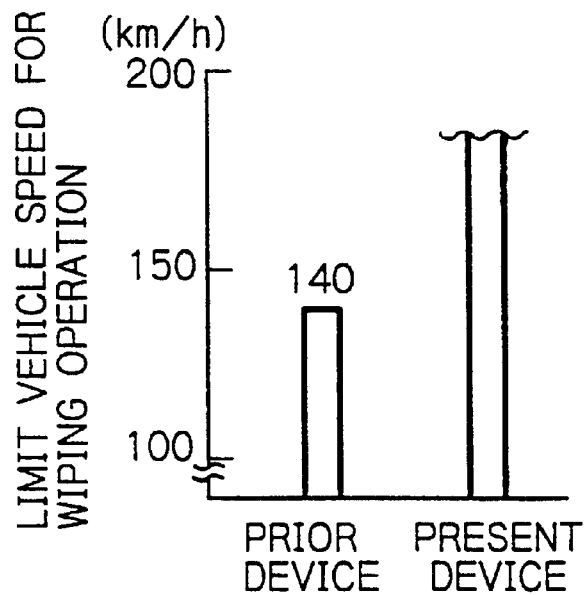
FIG. 5 is a view illustrating a comparison between the products of the present invention and a prior art product in t heir wiping limit speeds.

FIG. 5 shows evaluation results for a limit vehicle speed for a wiping operation which have been obtained by using a wind tunnel on an actual experimental vehicle, in which comparison is made between cases of the present embodiment and prior art devices as shown in FIG. 14. The maximum vehicle speed for a wiping operation used herein represents a vehicle velocity by which the wiper blade is caused to lift off the glass surface due to wind pressures while the vehicle is running, and by which the wiper blade may no longer operate to wipe the glass surface properly, thereby preventing a vehicle driver from operating the vehicle in a normal manner and causing the driver to have a sense of danger. What can be understood from this drawing is that while the limit vehicle speed for a wiping operation in the prior art device is 140 km/h, the present device could maintain sufficient wiping performance at the maximum limit vehicle speed of 180 km/h for the actual vehicle wind tunnel, which demonstrates a significant difference.

Figure 6:
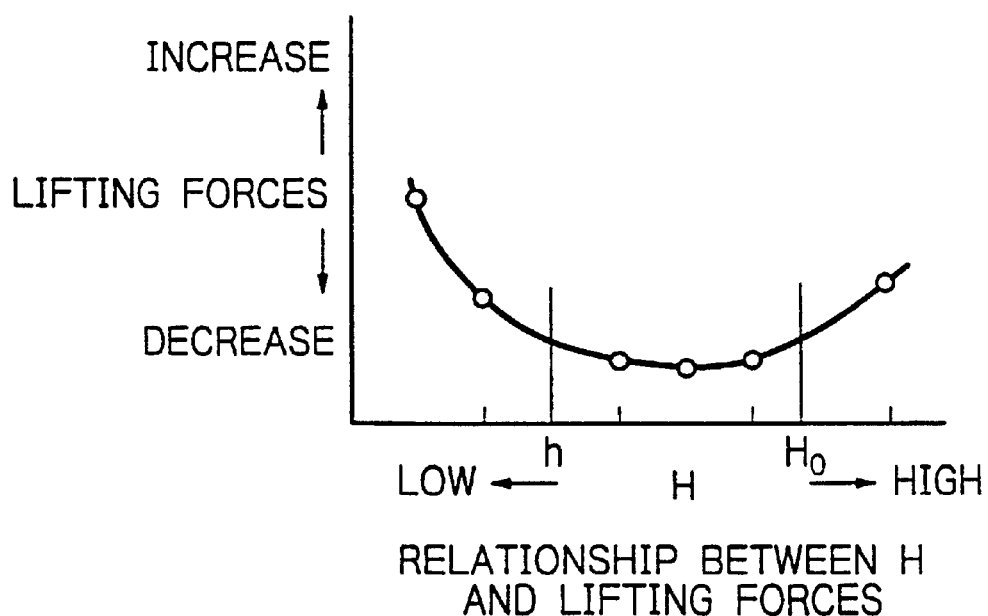
FIG. 6 is a view illustrating a relationship between the height H and lifting forces.

FIG. 6 is a view illustrating a relationship between the distance (height) H to be measured from the lower edge of the wind deflector to the glass surface and the lifting forces. What one can understand from this drawing is that lifting forces will be increased abruptly unless the height H is made greater then the height h of the blade rubber, whereas if it is made greater than the height Ho, then lifting forces will be reduced.

Figure 7:
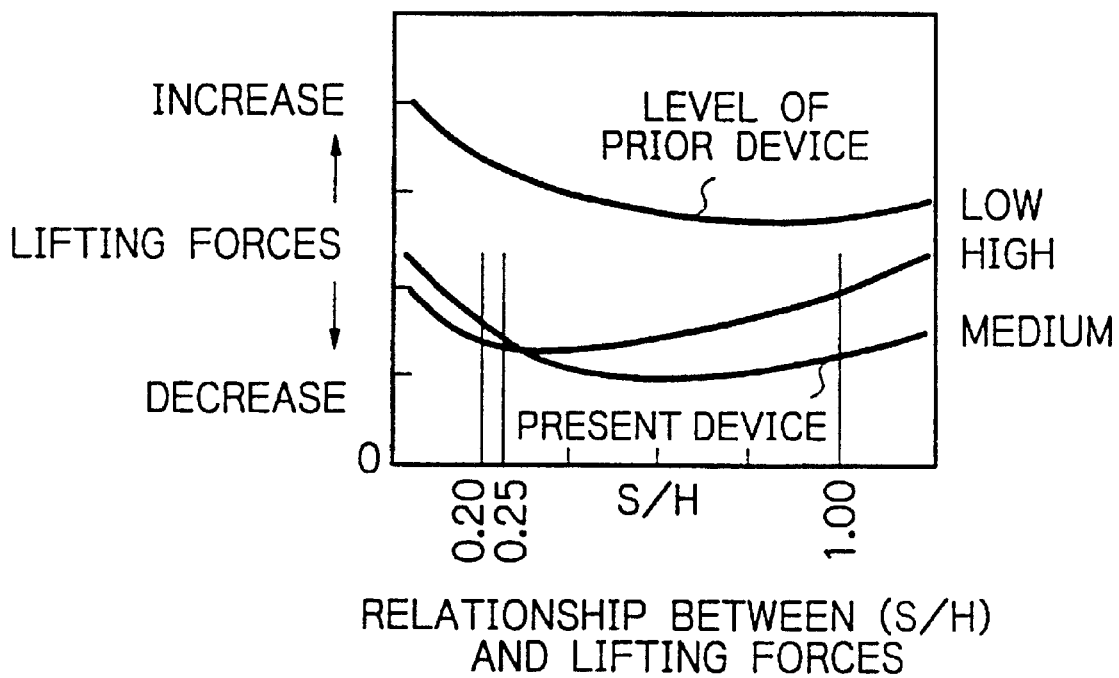
FIG. 7 is a view illustrating a relationship between the ratio (S/H) of the distance S and the height H, and lifting forces in the present device.

FIG. 7 is a view illustrating a relationship between a ratio of the distance S to be measured from the upper edge of the wind deflector 22 to the side position of main yoke 12 and the distance H to be measured from the lower edge of the wind deflector to the glass surface, relative to lifting forces. What one can understand from this drawing is that while lifting forces may be increased if the ratio (S/H) is made less than 1, they will be increased if the ratio (S/H) is made smaller than (1/5).

Figure 8:
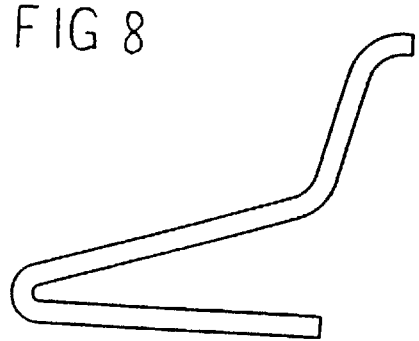
FIG. 8 is a view illustrating an alternative embodiment of the present invention.
Figure 9:
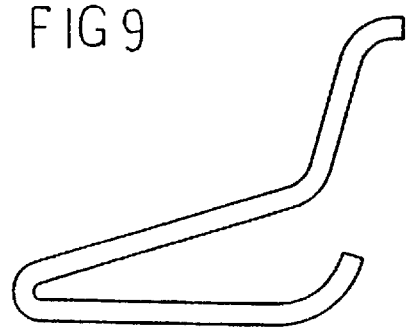
FIG. 9 is a view illustrating an alternative embodiment, i.e., an improved modification of the embodiment shown in FIG. 8.
Figure 10:
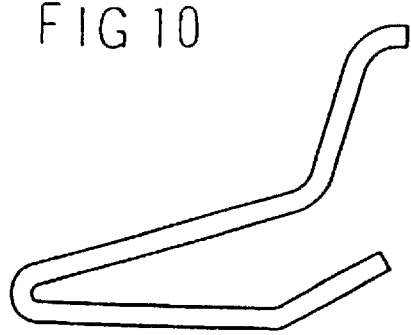
FIG. 10 is a view illustrating an alternative embodiment, i.e., a further improved modification of the embodiment shown in FIG. 8.
Figure 11:
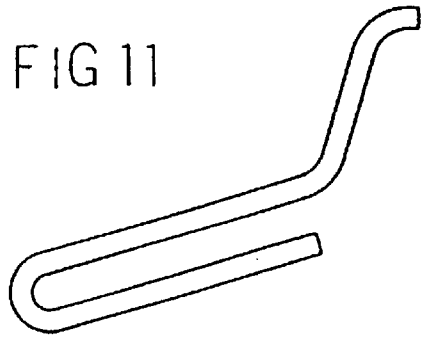
FIG. 11 is a view illustrating an alternative embodiment of the present invention.
Figure 12:
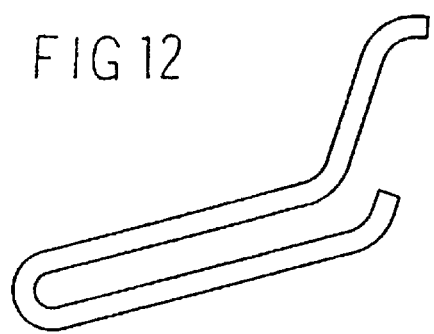
FIG. 12 is a view illustrating an alternative embodiment, i.e., an improved modification of the embodiment shown in FIG. 11.
Figure 13:
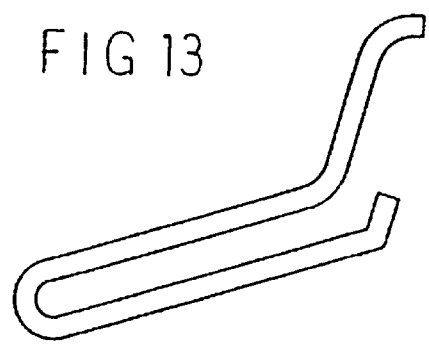
FIG. 13 is a view illustrating an alternative embodiment, i.e., a further improved modification of the embodiment shown in FIG. 11.

FIG. 8 through FIG. 13 illustrate alternative embodiments of the wind deflector of the present invention. These embodiments represent a configuration in which a tip section extending from the air stream-splitting section 26 extends toward the blade rubber 18. FIG. 8 illustrates an embodiment in which the air stream-splitting section 26 in FIG. 3 has a tip section which extends along and parallel with the glass surface toward the wiper blade. This extension extends to a position where it may not block the flow of the air stream. FIG. 9 is a view illustrating an embodiment of FIG. 8 which has been modified so that the tip section gently curves upwardly view similar to FIG. 9, but illustrates a configuration in which the tip section curves upwardly at an obtuse angle so as not to interfere with the movement of the air stream. FIG. 11 is a view illustrating an embodiment in which the extension is arranged to lie parallel with the pressure-receiving surface section 28. Again, the tip of the extension is located in such a position where it may not block the flow of the air stream. FIG. 12 is a view similar to FIG. 11, but illustrates an embodiment in which the tip section curves gently upward to ensure a smooth movement of the air stream. FIG. 13 is a view similar to FIG. 12, but illustrates an embodiment in which the tip section is made to curve upward at an obtuse angle so as not to interfere with the movement of the air stream.

In the present invention, a weir-zone may be created below the pressure-receiving surface section, and the weir-zone may serve to form a virtual blade surface to provide a sufficient effect As an alternative, however, a further substantial effect may be realized by making the tip of the air stream-splitting section extend in a rearward direction relative to the air stream, i.e., in the downward direction of the pressure-receiving surface section, to thereby control the weir-zone to have a desirable configuration.

In the meantime, in the embodiment of the present invention, the wind deflector is formed as an integral molding component which has been made though a stamping operation. Alternatively, the wind deflector may be made from resin materials, whereas a narrow support may be separately formed and subsequently attached to the main yoke.

INDUSTRIAL APPLICABILITY

According to the present invention, a lifting force can be reduced by causing the air stream which strikes the wiper blade to be deflected, while simultaneously allowing a differential velocity to be created between upper and lower pressure-receiving surfaces on the wind deflector. Thereby, a substantial differential pressure between these two surfaces is produced to generate a greater force to be imposed in the downward direction, i.e., against the glass surface. In this way, the present invention meets high-level requirements which have been increasingly required for the wiper blade to provide its high performance. In addition, the wind deflector may be made in its cross-section configuration merely from a blade material having a consistently uniform thickness, and thus eliminate additional costs.

What is claimed is:

1. A wiper blade for use in motor vehicles, comprising:
   a main yoke;
   a blade rubber attached to said main yoke for contacting a surface of a windshield; and
   a wind deflector positioned in front of said main yoke with respect to a flow direction of an airstream flowing against the wiper blade and connected to said main yoke by a support, said wind deflector having a cross-sectional configuration including a pressure-receiving surface section for generating downward forces, an airstream weir section extending from a rear end of said pressure-receiving surface section for reducing a velocity of the airstream, and an air stream-splitting section extending downwardly from a front end of said pressure-receiving surface section so as to form a water-weir section below said pressure-receiving surface section;
   wherein said wind deflector is arranged such that:
   a distance H between a lower edge of said airstream-splitting section and the surface of the windshield is greater than a height h of said blade rubber with respect to the surface of the windshield,
   a distance S between an upper end of said airstream weir section and said main yoke is formed such that $1 > (S/H) \geq (1/4)$,
   a length L1 of said pressure-receiving surface section is greater than or equal to a length L2 of said airstream weir section,
   an angle $\theta 1$ between a plane of said pressure-receiving surface section and the surface of the windshield is in a range $0° \leq \theta 1 \leq 30°$, and
   an angle $\theta 2$ between a plane of said pressure-receiving surface section and said airstream weir section at a rear side of said airstream weir section is in a range $30° \leq \theta 2 \leq 90°$.

2. The wiper blade of claim 1, wherein said airstream splitting section has a straight configuration.

3. The wiper blade of claim 2, wherein said wind deflector has a length equal to at least one-third of a length of the wiper blade.

4. The wiper blade of claim 1, wherein said airstream splitting section has a curved configuration.

5. The wiper blade of claim 4, wherein said wind deflector has a length equal to at least one-third of a length of the wiper blade.

6. The wiper blade of claim 1, wherein a section of attachment between said pressure-receiving surface section and said airstream weir section has a curved configuration.

7. The wiper blade of claim 6, wherein said wind deflector has a length equal to at least one-third of a length of the wiper blade.

8. The wiper blade of claim 1, wherein the cross-sectional configuration of said wind deflector further includes a tip section extending from a lower end of said airstream-splitting section in a rearward direction towards said blade rubber.

9. The wiper blade of claim 8, wherein said tip section is parallel to the surface of the windshield.

10. The wiper blade of claim 8, wherein said tip section is parallel to said pressure-receiving surface section.

11. The wiper blade of claim 8, wherein a longitudinal center point of said wind deflector is aligned with a longitudinal center point of the wiper blade with respect to the flow direction of the airstream flowing against the wiper blade.

12. The wiper blade of claim 8, wherein a longitudinal center point of said wind deflector is offset from a longitudinal centerpoint of the wiper blade toward an end of the wiper blade.

13. The wiper blade of claim 1, wherein said wind deflector has a length equal to at least one-third of a length of the wiper blade.

* * * * *